United States Patent
Zhuge et al.

(10) Patent No.: US 10,270,537 B2
(45) Date of Patent: Apr. 23, 2019

(54) METHOD AND SYSTEM FOR NONLINEAR INTERFERENCE MITIGATION

(71) Applicants: Qunbi Zhuge, Kanata (CA); Michael Andrew Reimer, Stittsville (CA); Shahab Oveis Gharan, Nepean (CA); Maurice Stephen O'Sullivan, Ottawa (CA)

(72) Inventors: Qunbi Zhuge, Kanata (CA); Michael Andrew Reimer, Stittsville (CA); Shahab Oveis Gharan, Nepean (CA); Maurice Stephen O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/707,476

(22) Filed: Sep. 18, 2017

(65) Prior Publication Data

US 2018/0083712 A1    Mar. 22, 2018

Related U.S. Application Data

(63) Continuation of application No. 14/717,762, filed on May 20, 2015, now Pat. No. 9,768,880.

(51) Int. Cl.
*H04B 10/2507* (2013.01)
*H04B 10/2563* (2013.01)
(Continued)

(52) U.S. Cl.
CPC ......... *H04B 10/58* (2013.01); *H04B 10/2557* (2013.01); *H04B 10/2563* (2013.01);
(Continued)

(58) Field of Classification Search
CPC . H04B 10/2572; H04B 10/58; H04B 10/2552
(Continued)

(56) References Cited

U.S. PATENT DOCUMENTS

| | | |
|---|---|---|
| 5,424,680 A | 6/1995 | Nazarathy et al. |
| 7,558,479 B1 | 7/2009 | Robinson |

(Continued)

FOREIGN PATENT DOCUMENTS

| | | |
|---|---|---|
| EP | 2733879 A1 | 5/2014 |
| WO | 2004088883 A1 | 10/2004 |

OTHER PUBLICATIONS

Winter, Marcus, "A Statistical Treatment of Cross-Polarization Modulation in DWDM Systems and its Application" Doctoral Thesis, Jun. 26, 2010, Berlin (196 Pages).

(Continued)

*Primary Examiner* — Oommen Jacob
(74) *Attorney, Agent, or Firm* — Integral IP; Miriam Paton; Amy Scouten

(57) ABSTRACT

A method for preventing nonlinear interference in an optical communication system. The method may include selecting an optical signal of a first optical channel. The method may include determining an estimate of inter-channel nonlinear interference to the optical signal of the first optical channel. The inter-channel nonlinear interference may be generated by one or more optical signals transmitted over a second optical channel in the optical communication system. The method may include determining one or more linear filters based on the estimate of the inter-channel nonlinear interference. The method may include pre-distorting an optical signal for transmission over the second optical channel using the one or more linear filters. The pre-distorted optical signal may be configured for reducing the inter-channel nonlinear interference to the first optical signal of the first optical channel. The method may include transmitting the pre-distorted optical signal over the second optical channel through an optical transmission medium.

19 Claims, 4 Drawing Sheets

(51) Int. Cl.
*H04B 10/2557* (2013.01)
*H04B 10/58* (2013.01)
*H04B 10/564* (2013.01)
*H04J 14/02* (2006.01)

(52) U.S. Cl.
CPC ....... *H04B 10/2572* (2013.01); *H04B 10/564* (2013.01); *H04J 14/0221* (2013.01); *H04B 2210/254* (2013.01)

(58) Field of Classification Search
USPC ............................................ 398/193, 81, 79
See application file for complete search history.

(56) References Cited

U.S. PATENT DOCUMENTS

| | | | |
|---|---|---|---|
| 7,983,208 B2 | 7/2011 | Cairns | |
| 8,073,340 B2 | 12/2011 | Ishaug et al. | |
| 8,139,954 B2 | 3/2012 | Awadalla et al. | |
| 8,600,330 B2 | 12/2013 | Schmidt | |
| 8,654,439 B2 | 2/2014 | Qian et al. | |
| 8,660,207 B2 | 2/2014 | Chandrasekaran | |
| 8,787,754 B1 * | 7/2014 | Beckett | H04B 10/0793 398/147 |
| 8,818,206 B2 | 8/2014 | Frankel | |
| 2003/0179830 A1 * | 9/2003 | Eidson | H04B 1/0475 375/296 |
| 2004/0197103 A1 * | 10/2004 | Roberts | H04B 10/2543 398/159 |
| 2006/0182204 A1 * | 8/2006 | Cairns | H04B 1/712 375/340 |
| 2010/0074630 A1 | 3/2010 | Olson et al. | |
| 2013/0308947 A1 | 11/2013 | Vacondio et al. | |
| 2014/0050476 A1 | 2/2014 | Grigoryan et al. | |
| 2014/0050477 A1 | 2/2014 | Rival et al. | |
| 2014/0133865 A1 | 5/2014 | Reimer et al. | |
| 2014/0140699 A1 | 5/2014 | Eiselt et al. | |
| 2014/0147117 A1 | 5/2014 | Kikuchi | |
| 2014/0376917 A1 | 12/2014 | Grigoryan et al. | |
| 2015/0071652 A1 | 3/2015 | Zhuge et al. | |
| 2015/0086193 A1 | 3/2015 | Liu et al. | |
| 2015/0146769 A1 | 5/2015 | Omer et al. | |
| 2015/0195045 A1 | 7/2015 | Zhuge et al. | |
| 2016/0233963 A1 | 8/2016 | Zhuge et al. | |
| 2016/0344482 A1 | 11/2016 | Zhuge et al. | |

OTHER PUBLICATIONS

Extended European Search Report in corresponding European Application No. 16170470.5-1874 dated Oct. 12, 2016 (7 pages).
Cisneros, First Exam Report for EP16170470, dated Jul. 9, 2018.

* cited by examiner

METHOD AND SYSTEM FOR NONLINEAR INTERFERENCE MITIGATION

BACKGROUND

Optical networks may transfer data over light waves. For example, a particular light wave may be generated at a transmitter and forwarded over an optical network to a receiver. Using an optical protocol, various light waves may be multiplexed using different frequency channels for transmission through the same transmission medium to various receivers. At the receivers, the light waves may be decoded into electrical signals.

SUMMARY

In general, in one aspect, embodiments relate to a method for preventing nonlinear interference in an optical communication system. The method includes selecting an optical signal of a first optical channel in the optical communication system. The method further includes determining an estimate of inter-channel nonlinear interference to the optical signal of the first optical channel. The inter-channel nonlinear interference is generated by one or more optical signals transmitted over a second optical channel in the optical communication system. The method further includes determining one or more linear filters based on the estimate of the inter-channel nonlinear interference. The method further includes pre-distorting an optical signal for transmission over the second optical channel using the one or more linear filters. The pre-distorted optical signal is configured for reducing the inter-channel nonlinear interference to the first optical signal of the first optical channel. The method further includes transmitting the pre-distorted optical signal over the second optical channel through an optical transmission medium.

In general, in one aspect, embodiments relate to a system for preventing nonlinear interference in an optical communication system. The system includes one or more linear filters configured for pre-distorting an optical signal. The one or more linear filters are based at least in part on an estimate of inter-channel nonlinear interference to a signal received on a first optical channel. The inter-channel nonlinear interference is generated by one or more optical signals transmitted over a second optical channel. The system further includes an optical transmitter configured for transmitting a pre-distorted optical signal, using the one or more linear filters, over the second optical channel. The pre-distorted optical signal is configured for reducing the inter-channel nonlinear interference to a first optical signal of a first optical channel during transmission of the pre-distorted optical signal over an optical transmission medium.

In general, in one aspect, embodiments relate to a system for preventing nonlinear interference in an optical communication system. The system includes one or more linear filters configured for pre-distorting an optical signal. The one or more linear filters are based at least in part on an estimate of inter-channel nonlinear interference to a signal received on a first optical channel. The inter-channel nonlinear interference is generated by one or more optical signals transmitted over a second optical channel. The system further includes an optical transmitter configured for transmitting a pre-distorted optical signal, using the one or more linear filters, over the second optical channel. The system further includes an optical receiver configured for receiving the pre-distorted optical signal over the second optical channel. The pre-distorted optical signal is configured for reducing the inter-channel nonlinear interference to a first optical signal of a first optical channel during transmission of the pre-distorted optical signal over an optical transmission medium.

Other aspects of the invention will be apparent from the following description and the appended claims.

DETAILED DESCRIPTION

Figure 1:
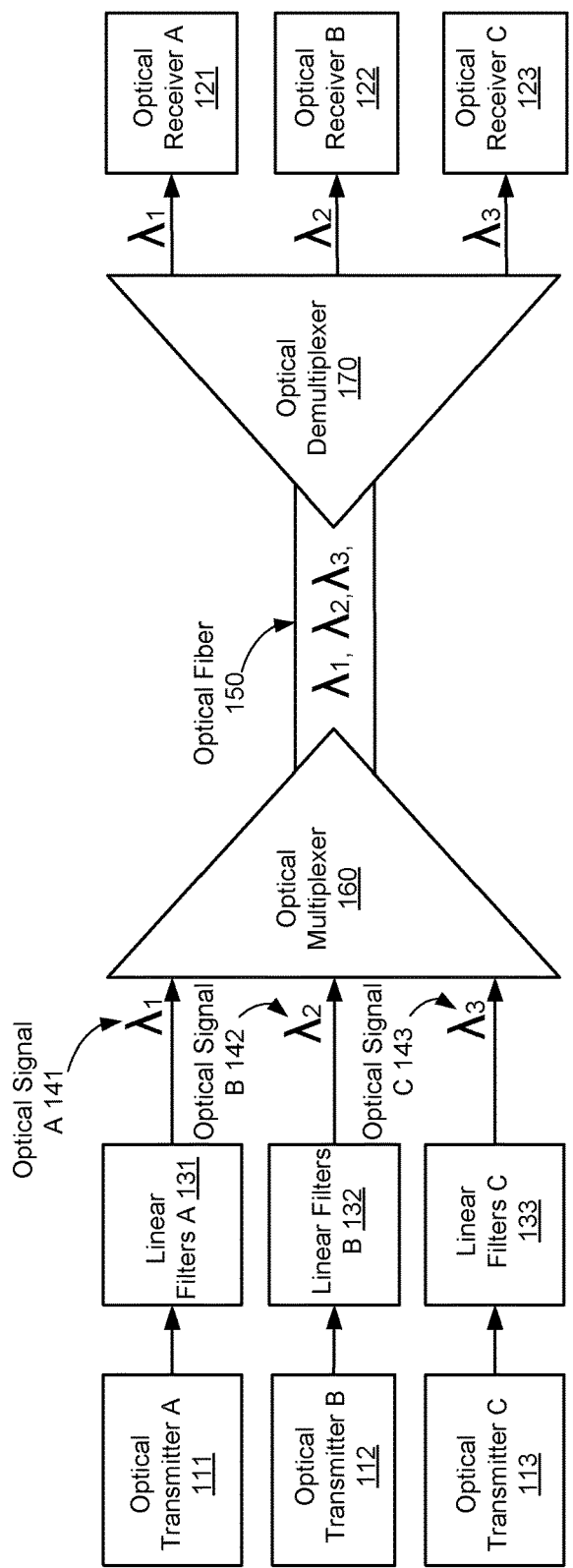
FIG. 1 shows a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a system and method for reducing nonlinear interference in an optical communication system. Inter-channel onlinear interference (XNLI) may include cross-phase modulation (XPM) and/or cross-polarization modulation (XPolM). Various optical signals may be pre-distorted before transmission through an optical medium to reduce the inter-channel nonlinear interference between the optical signals propagating along different optical channels. Pre-distortion may be performed on the optical signals using perturbation based nonlinear pre-distortion (which may be implemented using a number of parallel, linear finite impulse response (FIR) filters that operate on sequences constructed from the products of optical field samples) to both shape the spectrum of the optical power of the optical signal and reduce the XNLI developed between various optical channels in the optical communication system.

FIG. 1 shows a schematic view of an optical communication system in accordance with one or more embodiments. In one or more embodiments, the optical communication system as shown in FIG. 1 includes one or more optical transmitters (e.g., optical transmitter A (111), optical transmitter B (112), and optical transmitter C (113)), one or more sets of linear filters (e.g., linear filters A (131), linear filters B (132), linear filters C (133)) that operate on sequences constructed from the products of optical field samples, an optical multiplexer (e.g., optical multiplexer (160)), an optical demultiplexer (e.g., optical demultiplexer (170)), one or more optical receivers (e.g., optical receiver A (121), optical receiver B (122), and optical receiver C (123)), and an optical transmission medium (e.g., optical fiber (150), such as a single mode fiber (SMF)). The one or more optical transmitters may generate various optical signals (e.g., optical signal A (141), optical signal B (142), and optical signal C (143)) for transmission over various optical channels in the optical communication system. As such, the one or more optical transmitters may form an optical link with the one or more optical receivers for communicating data over the optical communication system. Furthermore, the communicated data may be transmitted over various optical channels in an optical protocol, such as wavelength division multiplexing (WDM).

An optical channel (not shown) may describe a specified range of optical frequencies or wavelengths in a particular bandwidth. For example, a specific optical channel may be designated for transmitting data as optical symbols over an optical transmission medium. An optical symbol (not shown) may correspond to a discrete portion of an optical signal with predefined optical characteristics, such as amplitude, phase, polarization, pulse length, etc. As such, a particular optical symbol may represent a predefined group of data bits transmitted over an optical communication system. Optical symbols may correspond to a particular modulation scheme, such as on-off keying (OOK) with non-return-to-zero (NRZ) amplitude modulation.

The optical transmitters (e.g., optical transmitter A (111), optical transmitter B (112), and optical transmitter C (113)) may include various components for generating and transmitting the optical signals. The various components may be, for example, a laser source, an electro-optic modulator, a driver circuit, a digital-to-analog converter, and an encoder. The encoder may receive data signals as an input and encode the data signals into the symbol domain. The driver circuit may generate a driver voltage that is converted into a digital drive signal by the digital-to-analog converter. The laser source or another optical source may generate an optical wave that is modulated by the electro-optic modulator using the analog drive signal. The electro-optic modulator may include phase modulators, variable optical attenuators, Mach-Zehnder interferometers, etc.

The optical multiplexer (160) may combine the optical signals into an optical transmission medium, e.g., the optical fiber (150). For example, the optical multiplexer (160) may be a fiber Bragg grating that includes various optical circulators to multiplex different optical signals onto different optical channels. As such, the optical multiplexer (160) may receive the various optical signals from the transmitters, multiplex the optical signals, and relay the multiplexed optical signals into the optical fiber (150) over various optical channels, e.g., different WDM channels.

On the other hand, the optical demultiplexer (170) may separate by wavelength the optical signals received at the end of the optical fiber (150). As such, the optical demultiplexer (170) may forward the optical signals to a corresponding optical receiver, e.g., optical receiver A (121), optical receiver B (122), and/or optical receiver C (123), depending on which optical channel was used for the optical signal.

The optical receivers (e.g., optical receiver A (121), optical receiver B (122), and optical receiver C (123)) may include various components for detecting optical signals and generating a corresponding data signal. For example, an optical receiver may include various components, such as photodetectors, an analog-to-digital converter, and a digital signal processing device. The photodetectors may detect the optical power in a received optical signal, and generate an electric analog signal accordingly. The analog-to-digital converter may convert the electric analog signal into a digital signal processed by the digital signal processing device to generate an output data signal for the optical communication system.

In one or more embodiments, the sets of linear filters (e.g., linear filters A (131), linear filters B (132), linear filters C (133)) are configured to pre-distort optical signals for transmission over a particular optical channel in the optical communication system. For example, the sets of linear filters (e.g., linear filters A (131), linear filters B (132), linear filters C (133)) may filter a sequence constructed from the products of optical field samples according to specific filter coefficients and a predetermined number of filter taps. The filter coefficients may also be selected to generate a predetermined spectrum of the optical power for various channels in the optical communication system. While the sets of linear filters (e.g., linear filters A (131), linear filters B (132), linear filters C (133)) are shown located as separate components between the optical transmitters (e.g., optical transmitter A (111), optical transmitter B (112), and optical transmitter C (113)) and the optical multiplexer (160) in FIG. 1, the sets of linear filters (e.g., linear filters A (131), linear filters B (132), linear filters C (133)) may be disposed inside various other components or at other locations throughout the optical communication system, such as in the optical transmitters (e.g., optical transmitter A (111), optical transmitter B (112), and optical transmitter C (113)), in the optical receivers (121, 122, 123), etc.

In one or more embodiments, one or more digital signal processing integrated circuits within the optical transmitters (111, 112, 113) operate as the linear filters (131, 132, 133). For example, an application specific integrated circuit (ASIC) may be located inside optical transmitter A (111) and be configured to pre-distort an optical signal in the optical communication system in FIG. 1. One or more digital signal processing integrated circuits may also be located within the optical receivers (121, 122, 123), e.g., for determining receiver-based measurements of nonlinear interference on optical signals in an optical channel.

Within an optical transmission medium, various optical signals may experience nonlinear interference. Nonlinear interference may include intra-channel nonlinear interference, such as self-phase modulation, or inter-channel nonlinear interference (XNLI) between optical signals propagating on different optical channels, e.g., between different spectral components of different channels within the WDM optical field. For example, inter-channel nonlinear interference may include cross-phase modulation (XPM) and cross-polarization modulation (XPolM). XPM may be a nonlinear effect where one wavelength of light primarily affects the phase of another wavelength of light through the Kerr effect, or quadratic electro-optic effect. In the Kerr effect, the refractive index of a material may change in response to an electric field applied to the material. With respect to XPolM, the coupling of optical signals within an optical transmission medium, such as the optical fiber (150) may produce changes in the polarization states of the optical signals.

After passing through an optical transmission medium, an optical signal may be detected at an optical receiver together with inter-channel nonlinear interference and other noise. In one or more embodiments, the inter-channel nonlinear interference field may be modeled between a selected first optical signal of a first optical channel (also called a probe signal) and a second, interfering optical signal on a second optical channel (also called the pump signal) within an optical transmission medium. As such, the detected optical signal may be expressed using the following equations:

$$rx1_k \approx x1_k + \Delta x1_k^{XNLI} + \Delta nx1_k$$

$$ry1_k \approx y1_k + \Delta y1_k^{XNLI} + \Delta ny1_k \qquad \text{Equation 1}$$

where k is the index of the $k^{th}$ transmitted optical symbol; $rx1_k$ and $ry1_k$ are the X- and Y-polarizations, respectively, of the $k^{th}$ optical symbol of the probe signal as measured at the optical receiver; $x1_k$ and $y1_k$ are the X- and Y-polarizations, respectively, of the $k^{th}$ optical symbol transmitted on the probe signal; $\Delta x1_k^{XNLI}$ and $\Delta y1_k^{XNLI}$ are measurements of the inter-channel nonlinear interference as received on the X- and Y-polarizations of the probe signal at time index k, respectively, caused by the interfering pump signal; and $nx1_k$ and $ny1_k$ are the X- and Y-polarization estimates of other noise sources measured at the optical receiver, for example, intra-channel nonlinear interference and Amplified Spontaneous Emission (ASE).

In one or more embodiments, the XNLI developed between the pump and probe signals may be modeled as the sum of contributions due to XPM and XPolM according to the following equations:

$$\Delta x1_k^{XNLI} \approx \Delta x1_k^{XPM} + \Delta x1_k^{XPolM}$$

$$\Delta y1_k^{XNLI} \approx \Delta y1_k^{XPM} + \Delta y1_k^{XPolM} \qquad \text{Equation 2}$$

where $\Delta x1_k^{XPM}$ and $\Delta y1_k^{XPM}$ are the X- and Y-polarizations of the nonlinear interference field due to XPM, respectively, at time index k; and $\Delta x1_k^{XPolM}$ and $\Delta y1_k^{XPolM}$ are the X- and Y-polarizations of the nonlinear interference field due to XPolM, respectively, at time index k.

Furthermore, the nonlinear interference due to XPM (also referred to as XPM or XPM interference) affecting the X- and Y-polarizations of the k:th transmit symbol of the probe signal may be estimated using the following equations:

$$\Delta x1_k^{XPM} = \sum_{m=-M}^{M} \sum_{n=-M}^{M} C_{m,n}^{XNLI} x1_{k+n}$$
$$[2x2^*_{k+m+n} x2_{k+m} + y2^*_{k+m+n} y2_{k+m} - 3\delta(n)P2]$$

$$\Delta y1_k^{XPM} = \sum_{m=-M}^{M} \sum_{n=-M}^{M} C_{m,n}^{XNLI} y1_{k+n}$$
$$[2y2^*_{k+m+n} y2_{k+m} + x2^*_{k+m+n} x2_{k+m} - 3\delta(n)P2] \qquad \text{Equation 3}$$

where the summation range, m, n=−M, . . . , M, corresponds with the number of symbols, 2M+1, that interact through chromatic dispersion; $x2_k$ and $y2_k$ are the X- and Y-polarizations of the k:th optical symbol transmitted on the interfering optical signal, respectively; the superscript * denotes complex conjugation; $\delta(n)$ is the Kronecker delta function with $\delta(n)=1$ if n=0 and $\delta(n)=0$ otherwise; P2 is the average symbol energy on a single polarization of the interfering optical signal; and $C_{m,n}^{XNLI}$ is a complex number that characterizes the efficiency of the nonlinear interaction between the selected optical signal and the optical signal transmitted over the interfering optical channel. For example, the complex number $C_{m,n}^{XNLI}$ may depend upon the chromatic dispersion experienced by the pump and probe signals, the fiber's Kerr nonlinear parameter and a specific transmitter pulse shape.

Analogously, the nonlinear interference due to XPolM (also referred to as XPolM or XPolM interference) affecting the X- and Y-polarizations of the k:th transmit symbol of the probe signal may be estimated using the following equations:

$$\Delta x1_k^{XPolM} \Sigma_{m=-M}^{M} \Sigma_{n=-M}^{M} C_{m,n}^{XNLI}$$
$$y2^*_{k+m+n} x2_{k+m} y1_{k+n}$$

$$\Delta y1_k^{XPolM} \Sigma_{m=-M}^{M} \Sigma_{n=-M}^{M} C_{m,n}^{XNLI} x2^*_{k+m+n}$$
$$y2_{k+m} x1_{k+n}. \qquad \text{Equation 4}$$

In one or more embodiments, the product ab* of two (single polarization) transmit symbols a and b will be referred to as a symbol doublet. Further, power and polarization doublets will be defined as $x_k x^*_k = |x_k|^2$ and $x_k y^*_n$, respectively, and are constructed from transmit symbols $x_k$ and $y_n$ modulated onto the orthogonal X- and Y-polarizations of the k:th and n:th signalling intervals. In general, the transmit symbols a and b comprising a particular doublet may be selected from any two of the modulated frames comprising a multidimensional optical signal. Analogously, the product abc* of any three (single polarization) transmit symbols a, b, and c will be referred to as a symbol triplet.

In one or more embodiments, the terms corresponding to n=0 in Equations 3 and 4 represent the most significant contribution to the XPM and XPolM interference, respectively, of the selected optical probe signal. Consequently, in one or more embodiments, the XPM interference is estimated using the following equations:

$$\Delta x1_k^{XPM} = x1_k \Sigma_{m=-M}^{M} C_{m,0}^{XNLI} [2|x2_{k+m}|^2 + |y2_{k+m}|^2 - 3P2]$$

$$\Delta y1_k^{XPM} = y1_k \Sigma_{m=-M}^{M} C_{m,0}^{XNLI} [2|y2_{k+m}|^2 + |x2_{k+m}|^2 - 3P2] \qquad \text{Equation 5}$$

Analogously, in one or more embodiments, the XPolM interference is estimated using the following equations:

$$\Delta x1_k^{XPolM} = y1_k \Sigma_{m=-M}^{M} C_{m,0}^{XNLI} y2^*_{k+m} x2_{k+m}$$

$$\Delta y1_k^{XPolM} = x1_k \Sigma_{m=-M}^{M} C_{m,0}^{XNLI} x2^*_{k+m} y2_{k+m} \qquad \text{Equation 6}$$

Based on Equation 5, the XPM interference on the probe signal may be proportional to the power variation of the optical symbols transmitted over the pump signal (or, equivalently the power doublets of each of the X- and Y-polarizations of the pump signal, $|x2_{k+m}|^2 - P2$ and $|y2_{k+m}|^2 - P2$) filtered by a low-pass finite impulse response (FIR) filter with coefficients $C_{m,0}^{XNLI}$. Specifically, various low frequency components of the interfering channel's spectrum of the optical power may affect the amount of XPM interference on the selected optical probe signal. As such, transmitting a pre-distorted optical signal on the interfering pump signal may suppress the low frequency components of the spectrum of the optical power and reduce the XPM interference.

Based on the estimated XPM interference, Equation 5, an X-polarized pre-distorted optical symbol $x2'_k$ and Y-polarized pre-distorted optical symbol $y2'_k$ may be computed for the interfering pump signal. For example, the X-polarized pre-distorted optical symbol may be expressed in the following equation:

$$x2'_k = x2_k - \Delta x2_k \qquad \text{Equation 7}$$

where $x2'_k$ is the X-polarized pre-distorted optical symbol on the interfering pump signal, $x2'_k$ is the ideal X-polarized optical symbol on the interfering pump signal, and $\Delta x2_k$ is the X-polarization pre-distortion term. An ideal optical symbol may be a member of the constellation alphabet that modulates the optical signal of the optical channel at the optical transmitter of an optical communication system. The X-polarized pre-distortion term may reference the pre-distortion applied to the ideal optical symbol to prevent the XPM interference. In one or more embodiments, the X-polarization pre-distortion term may be computed based on the following equation:

$$\Delta x2_k = x2_k \Sigma_{p=-P}^{P} A_p [|x2_{k+p}|^2 - P2] \qquad \text{Equation 8}$$

where $A_p$ are the coefficients of a shaping filter that may be real valued and positive; and P may describe the length of the shaping filter.

Similarly, the Y-polarized pre-distorted optical symbol may be expressed in the following equation:

$$y2'_k = y2_k - \Delta y2_k \qquad \text{Equation 9}$$

where $y2'_k$ is the Y-polarized pre-distorted optical symbol on the interfering pump signal, $y2_k$ is the ideal Y-polarized optical symbol on the interfering pump signal, and $\Delta y2_k$ is the Y-polarization pre-distortion term. The Y-polarization pre-distortion term may be computed based on the following equation:

$$\Delta y2_k = y2_k \Sigma_{p=-P}^{P} A_p [|y2_{k+p}|^2 - P2] \qquad \text{Equation 10}$$

For example, in a 32QAM modulation scheme, the shaping coefficient may be $A_p = 0.0047$, with P=32 such that p=−32, ... , 32. As such, the low frequency components of the spectrum of the optical power of the pre-distorted optical signal may be controlled by the length and amplitude of the shaping filter. The optimum values of the shaping filter may be determined using system parameters such as a specified dispersion map, fiber nonlinear coefficient, signal power and/or optical channel spacing.

In one or more embodiments, the transmitted optical symbols of an interfering pump signal may be pre-distorted according to:

$$x2'_k = x2_k - y2_k \Sigma_{q=-Q}^{Q} B_q x2_{k+q} y2^*_{k+q} \qquad \text{Equation 11}$$

$$y2'_k = y2_k - x2_k \Sigma_{q=-Q}^{Q} B_q y2_{k+q} x2^*_{k+q} \qquad \text{Equation 12}$$

where $B_q$ are real-valued coefficients of a pre-distortion filter with length 2Q+1. In what follows, the symbol triplets appearing in Equations 11-12 will be referenced as "destructive polarization triplets."

In one or more embodiments, Equations 11-12 are substituted into Equation 6, and the XPolM polarization noise on the selected probe signal may be expressed as the following equation:

$$\Delta x1_k^{XPolM} = \qquad \text{Equation 13}$$

$$y1_k \sum_{m=-M}^{M} C_{m,0}^{XNLI} \left( x2_{k+m} - y2_{k+m} \sum_{q=-Q}^{Q} B_q x2_{k+m+q} y2^*_{k+m+q} \right)$$

$$\left( y2^*_{k+m} - x2^*_{k+m} \sum_{q=-Q}^{Q} B_q y2^*_{k+m+q} x2_{k+m+q} \right)$$

which may be expanded to become the following equation:

$$\Delta x1_k^{XPolM} = \qquad \text{Equation 14}$$

$$y1_k \sum_{m=-M}^{M} C_{m,0}^{XNLI} \left( x2_{k+m} y2^*_{k+m} - [|x2_{k+m}|^2 + |y2_{k+m}|^2] \right.$$

$$\left. \sum_{q=-Q}^{Q} B_q x2_{k+m+q} y2^*_{k+m+q} + \ldots \right)$$

As shown in Equation 14, if the pre-distortion filter coefficients $B_q$ are both real valued and positive, then the second term may at least partially destructively interfere with the original polarization doublets described by the first term. The resulting destructive interference may reduce the XPolM polarization noise for the selected optical signal. In an optical communication system, the pre-distortion coefficients $B_q$ of the interfering pump signal may be selected to minimize the XPolM polarization noise generated on the selected probe signal by the interfering pump signal.

Similarly, in one or more embodiments, destructive polarization triplets may be configured to at least partially compensate symbol triplets associated with XPM interference on the selected probe signal. In one or more embodiments, for example, using Equation 3, XPM interference from those terms with n≠0, namely $$\Delta x1_k^{XPM} = \qquad \text{Equation 15}$$

$$\sum_{m=-M}^{M} \sum_{\substack{n=-M \\ n \neq 0}}^{M} C_{m,n}^{XNLI} x1_{k+n} [2 x2^*_{k+m+n} x2_{k+m} + y2^*_{k+m+n} y2_{k+m}]$$

$$\Delta y1_k^{XPM} = \sum_{m=-M}^{M} \sum_{\substack{n=-M \\ n \neq 0}}^{M} C_{m,n}^{XNLI} y1_{k+n}$$

$$[2 y2^*_{k+m+n} y2_{k+m} + x2^*_{k+m+n} x2_{k+m}],$$

is reduced by pre-distorting the X-polarized and Y-polarized optical symbols on the interfering pump signal. For example, the pre-distorted optical symbols for the X- and Y-polarizations of the interfering pump signal may be pre-distorted as shown in the following equations:

$$x2'_k = x2_k - \sum_{q=-Q}^{Q} \sum_{\substack{n=-N \\ n \neq 0}}^{N} A1_{q,n} x2_{k+n} x2_{k+q} x2^*_{k+n+q} - \qquad \text{Equation 16}$$

$$\sum_{q=-Q}^{Q} \sum_{\substack{n=-N \\ n \neq 0}}^{N} A2_{q,n} x2_{k+n} y2_{k+q} y2^*_{k+n+q}$$

$$y2'_k = y2_k - \sum_{q=-Q}^{Q} \sum_{\substack{n=-N \\ n \neq 0}}^{N} A1_{q,n} y2_{k+n} y2_{k+q} y2^*_{k+n+q} - \qquad \text{Equation 17}$$

$$\sum_{q=-Q}^{Q} \sum_{\substack{n=-N \\ n \neq 0}}^{N} A2_{q,n} y2_{k+n} x2_{k+q} x2^*_{k+n+q}$$

where $A1_{q,n}$ and $A2_{q,n}$ are coefficients of 2N pre-distortion filters each of length 2Q+1. Combinations of symbol triplets on the probe signal, given by Equation 15, may be at least partially compensated by selecting the pre-distortion filter coefficients $A1_{q,n}$ and $A2_{q,n}$ accordingly.

Furthermore, in one or more embodiments, destructive polarization triplets may be configured to at least partially compensate other symbol triplets associated with XPolM interference on the selected probe signal. For example, using Equation 4, in one or more embodiments, the XPolM interference from those terms with $n \neq 0$, namely:

$$\Delta x1_k^{XPolM} = \sum_{m=-M}^{M} \sum_{\substack{n=-M \\ n \neq 0}}^{M} C_{m,n}^{XNLI} y2_{k+m+n}^* x2_{k+m} y1_{k+n} \quad \text{Equation 18}$$

$$\Delta y1_k^{XPolM} = \sum_{m=-M}^{M} \sum_{\substack{n=-M \\ n \neq 0}}^{M} C_{m,n}^{XNLI} x2_{k+m+n}^* y2_{k+m} x1_{k+n}.$$

may be compensated at least in part by pre-distorting the interfering optical channel according to $$x2_k' = x2_k - \sum_{q=-Q}^{Q} \sum_{\substack{n=-N \\ n \neq 0}}^{N} B1_{q,n} x2_{k+q} y2_{k+n} y2_{k+n+q}^* \quad \text{Equation 19}$$

$$y2_k' = y2_k - \sum_{q=-Q}^{Q} \sum_{\substack{n=-N \\ n \neq 0}}^{N} B1_{q,n} y2_{k+q} x2_{k+n} x2_{k+n+q}^* \quad \text{Equation 20}$$

where $B1_{q,n}$ is a coefficient of 2N pre-distortion filters each with length 2Q+1. Combinations of symbol triplets on the probe signal, given by Equation 18, may be at least partially compensated by selecting the pre-distortion filter coefficients $B1_{q,n}$ accordingly.

Figure 2:
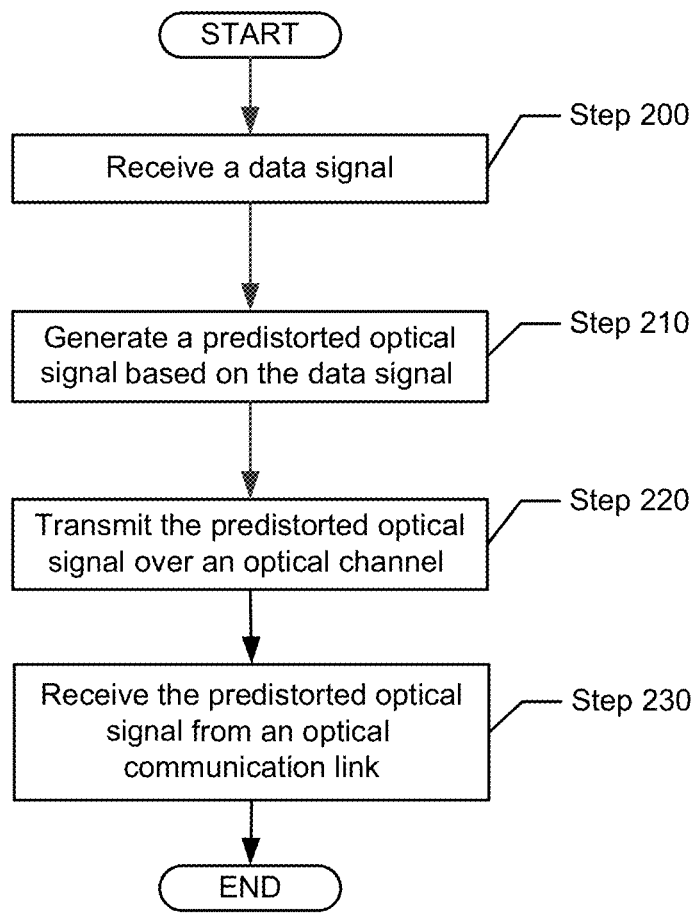
FIGS. 2 and 3 show flowcharts in accordance with one or more embodiments.
Figure 3:
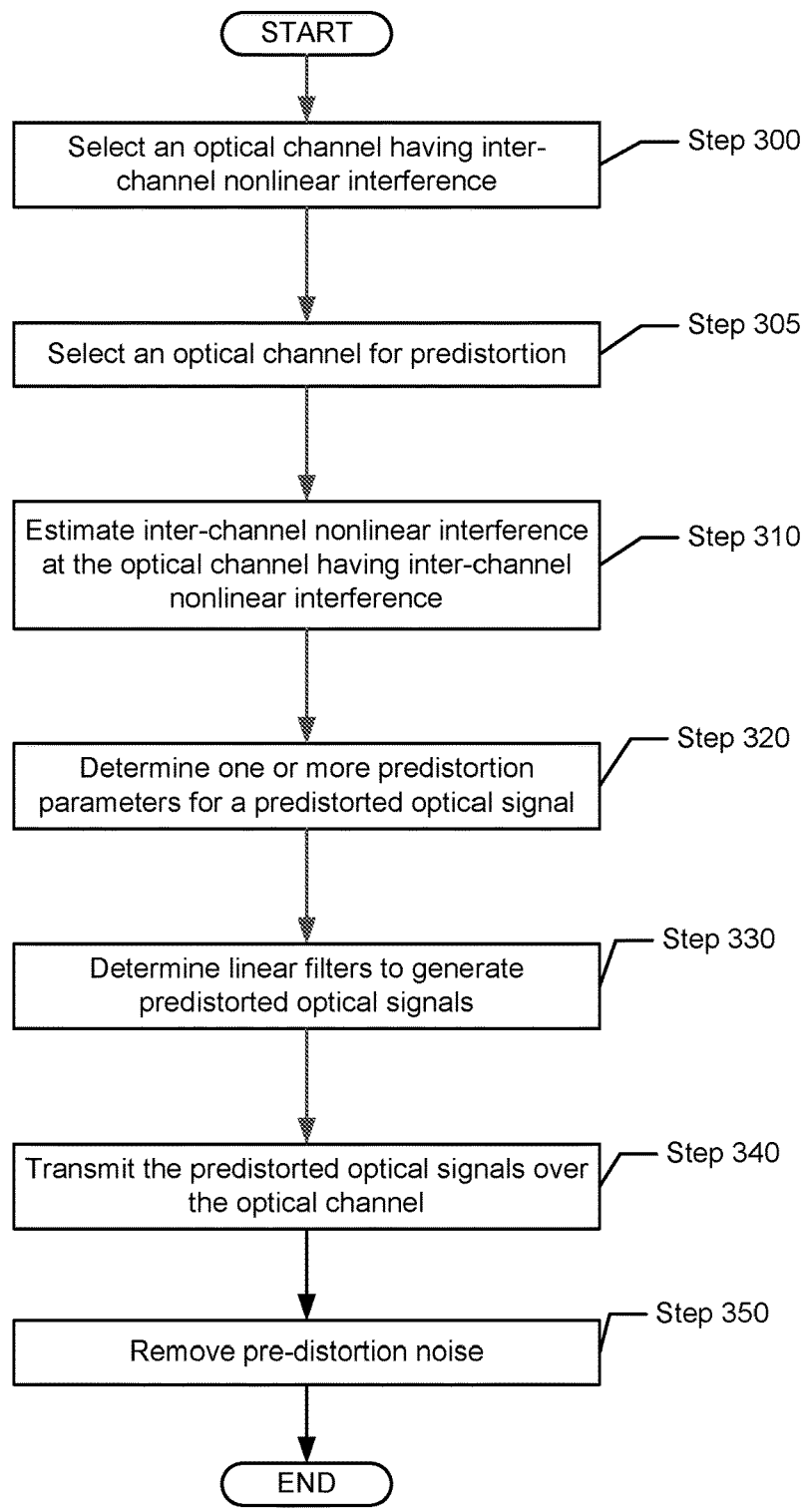

FIG. 2 and FIG. 3 show flowcharts in accordance with one or more embodiments. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt-driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for reducing nonlinear interference in an optical communication system. Specifically, in one or more embodiments, the process depicted in FIG. 2 is performed by an optical transmitter and/or an optical receiver. In Step 200, a data signal is received in accordance with one or more embodiments. The data signal may be received in the electric domain at an optical transmitter and correspond to one or more optical symbols for transmission over an optical medium.

In Step 210, a pre-distorted optical signal is generated based on the data signal in accordance with one or more embodiments. For example, the pre-distorted optical signal may be generated using various linear filters in an optical communication system. The linear filters may have pre-defined filter coefficient values and a specified number of filter taps to generate a pre-distorted optical signal.

In one or more embodiments, the one or more linear filters include various finite impulse response (FIR) filters. Specifically, linear filters may configure various pre-distorted optical signals for transmission through the optical transmission medium. The linear filters may filter the optical signals to have specific optical characteristics, such as with respect to amplitude, phase, X-polarization, Y-polarization, and/or other characteristics of the optical signals transmitted through the optical transmission medium. The linear filters may also shape the spectrum of the optical power within the optical transmission medium, such as through defining a pre-determined dispersion map.

In Step 220, the pre-distorted optical signal is transmitted over an optical channel in accordance with one or more embodiments. Specifically, the pre-distorted optical signal may be transmitted to an optical multiplexer for combining with other optical signals in an optical transmission medium. For example, pre-distorted optical signals for various respective optical channels may be combined with non-pre-distorted optical signals traveling over other optical channels in the optical communication system. The optical transmission medium may be a single mode fiber, or any other applicable medium.

In Step 230, the pre-distorted optical signal is received from an optical link in accordance with one or more embodiments. Specifically, the pre-distorted optical signal may be separated at the end of an optical transmission medium from other optical signals located on other optical channels by an optical demultiplexer. As such, the optical demultiplexer may relay the pre-distorted optical signal to a corresponding optical receiver in the optical communication system. At the corresponding optical receiver, data may be determined or decoded from the pre-distorted optical signal and forwarded in the electric domain.

FIG. 3 shows a flowchart describing a method for reducing nonlinear interference in an optical communication system. Specifically, in one or more embodiments, the process depicted in FIG. 3 is performed by an optical transmitter and/or an optical receiver. In Step 300, an optical channel is selected (hereinafter "optical channel with XNLI") having inter-channel nonlinear interference (XNLI) in accordance with one or more embodiments. Specifically, optical signals transmitted over the optical channel with XNLI may experience nonlinear interference, such as cross-phase modulation, from optical signals transmitted over other optical channels used by the optical communication system. In one or more embodiments, the optical channel with XNLI is for a wavelength division multiplexing (WDM) channel for a WDM system.

In Step 305, an optical signal is selected for pre-distortion (hereinafter "optical signal for pre-distortion") in accordance with one or more embodiments. In one or more embodiments, the optical signal for pre-distortion corresponds to the interfering optical channel described with respect to FIG. 1. For example, the optical signal for pre-distortion may be a WDM channel with frequency bandwidth adjacent to the frequency bandwidth of the optical channel with XNLI. Specifically, the optical signal for pre-distortion may be a neighboring optical channel to the optical channel with XNLI in a spectrum for the optical communication system. As such, optical signals transmitted over the optical channel for pre-distortion may contribute inter-channel nonlinear interference to the optical channel with XNLI.

In Step 310, inter-channel nonlinear interference is estimated at the optical channel with XNLI in accordance with one or more embodiments. For example, the XNLI from the optical channel for pre-distortion to the optical channel with XNLI may be estimated according Equations 1-5 and the accompanying description in FIG. 1. Specifically, the XNLI may be analyzed with respect to the X-polarization and Y-polarization of various optical symbols transmitted over the optical channel for pre-distortion.

In one or more embodiments, an estimate of inter-channel nonlinear interference is from receiver-based measurements of inter-channel nonlinear interference. For example, measurements for an initial optical signal in a sequence of optical signals may be acquired at an optical receiver. From the initial optical signal measurements, the inter-channel nonlinear interference may be estimated for the corresponding optical channel.

In Step 320, one or more pre-distortion parameters are determined for a pre-distorted optical signal in accordance with one or more embodiments. In one or more embodiments, the one or more pre-distortion parameters may correspond to the shaping coefficients described with respect to FIG. 1 for determining a pre-distorted optical waveform. As such, the pre-distortion parameters may correspond to an optical signal transmitted over the optical channel for pre-distortion selected in Step 305.

In one or more embodiments, actual values for the one or more pre-distortion parameters may be obtained by sampling a transmitted optical signal. The sampling may be performed using time domain samples or frequency domain samples. Sampling may be performed with a sampling rate that equals the optical symbol rate of transmission.

In one or more embodiments, the one or more pre-distortion parameters are configured to include destructive triplets for XPolM, destructive triplets for other XPM terms, and shaping of the spectrum of the optical power. This pre-distortion for the optical signal may be performed using an array of linear filters. For example, one particular pre-distortion of an optical signal may be expressed by the following equations:

$$\Delta x'_k = \sum_{q=-Q}^{Q} x_{k+q} \sum_{p=-P}^{P} C_{p,q}(x_{k+p}x^*_{k+p+q} + y_{k+p}y^*_{k+p+q})$$ Equation 21

$$\Delta x_k = \Delta x'_k - E\{\Delta x'_k\}$$

where $\Delta x_k$ is the pre-distortion for the X-polarization of the $k^{th}$ transmitted optical symbol; $C_{p,q}$ is a shaping coefficient that is real and positive; $2Q+1$ is the number of linear filters; $2P+1$ is the number of filter taps; $x_p x^*_{p+q}$ is an X-polarization symbol doublet; $y_p y^*_{p+q}$ is a Y-polarization symbol doublet; and $E\{\Delta x'_k\}$ is the expected value of the pre-distortion on a single polarization of the optical signal.

In Step 330, one or more linear filters are determined for generating pre-distorted optical signals in accordance with one or more embodiments. The one or more linear filters may be determined based on the one or more pre-distortion parameters from Step 320. The one or more linear filters may pre-distort the X-polarization of an optical symbol and/or the Y-polarization of the optical symbol. As such, the pre-distorted optical signal may include a series of pre-distorted transmitted optical symbols that generate less XNLI on the optical channel with XNLI. In one or more embodiments, the one or more linear filters are implemented using parallel summations. In one or more embodiments, filter tap coefficient values for the one or more linear filters are determined based on physical properties of the optical transmission medium, e.g., a single mode fiber. In one or more embodiments, the one or more linear filters pre-distort optical symbols of optical sub-channels. In one or more embodiments, the one or more linear filters are determined based on receiver-based measurements of inter-channel nonlinear interference on an optical signal obtained from an optical channel. In one or more embodiments, the optical signal is the initial optical signal in a sequence of optical signals.

In Step 340, one or more pre-distorted optical signals are transmitted over the optical channel in accordance with one or more embodiments. Using the one or more linear filters from Step 330, for example, an optical communication system may generate various pre-distorted optical signals for transmission over an optical transmission medium, such as an optical fiber. The pre-distorted optical signal may transmit over the optical transmission medium while generating less XNLI than optical signals without pre-distortion would.

In Step 350, pre-distortion noise may be removed in accordance with one or more embodiments. Applying pre-distortion to various optical signals may generate additional pre-distortion noise in optical signals measured at various optical receivers. Using digital signal processing, for example, the pre-distortion noise may be removed at a particular optical receiver. The optical transmission medium may also cancel a portion of the pre-distortion noise through self-phase modulation during transmission of the pre-distorted optical signals.

Figure 4:
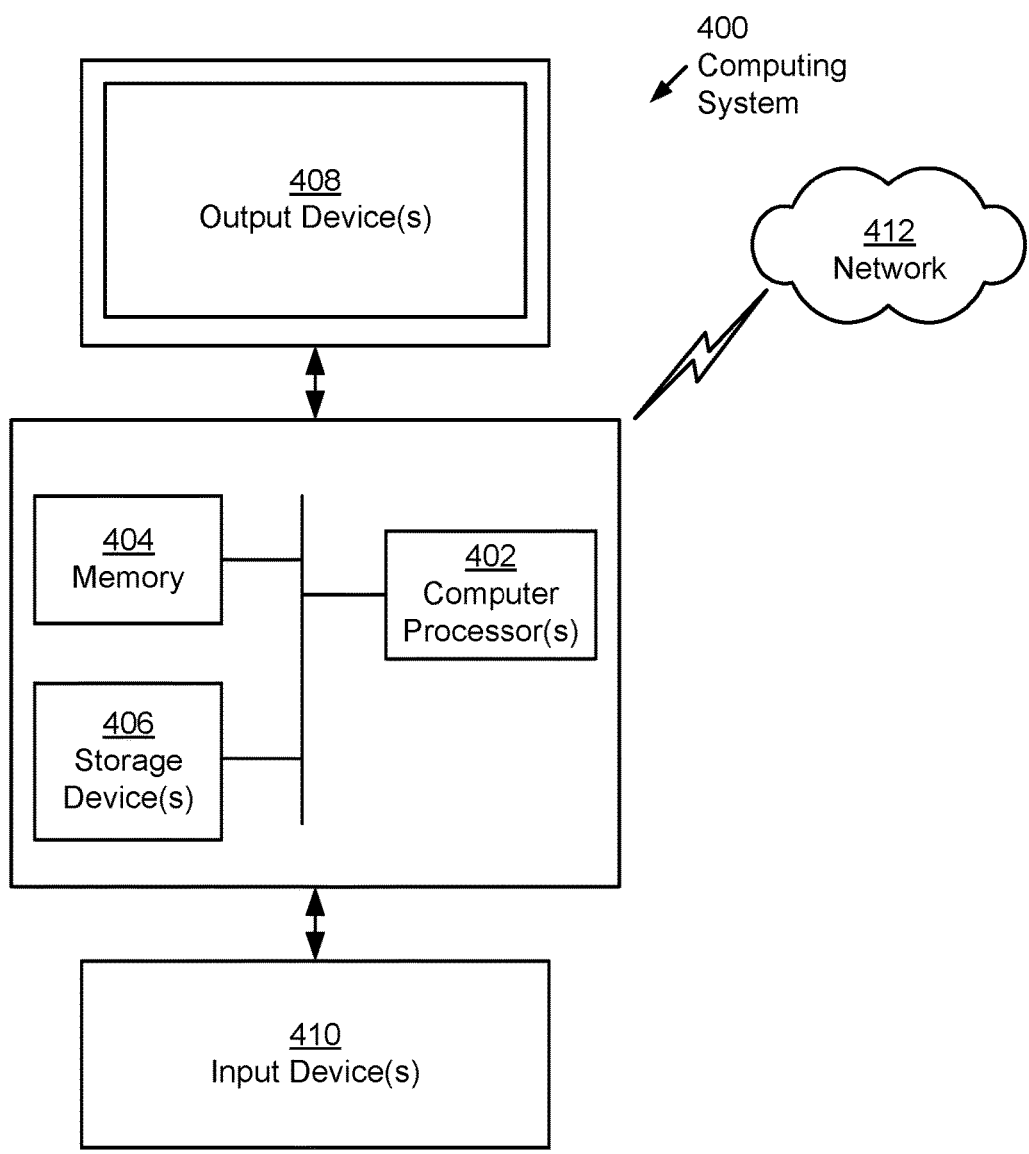
FIG. 4 shows a system in accordance with one or more embodiments.

Embodiments of the invention may be implemented on a computing system. Any combination of mobile, desktop, server, embedded, or other types of hardware may be used. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions.

For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing nonlinear interference in an optical communication system, comprising:
   determining filter tap coefficient values for one or more linear filters based, at least in part, on an estimate of inter-channel nonlinear interference experienced on a first optical channel of the optical communication system due to transmissions on a second optical channel in the optical communication system, where the second optical channel is distinct from the first optical channel;
   using the one or more linear filters to calculate a perturbation solely from the filter tap coefficient values and from products of samples of an optical signal intended for transmission over the second optical channel;
   applying the perturbation to the optical signal intended for transmission over the second optical channel to produce a pre-distorted optical signal, wherein the pre-distorted optical signal is configured for reducing the inter-channel nonlinear interference experienced on the first optical channel; and
   transmitting the pre-distorted optical signal over the second optical channel through an optical transmission medium.

2. The method of claim 1, wherein the estimate of the inter-channel nonlinear interference comprises an estimate of cross-phase modulation (XPM) experienced on the first optical channel due to transmissions on the second optical channel.

3. The method of claim 1, wherein the estimate of the inter-channel nonlinear interference comprises an estimate of cross-polarization modulation (XPolM) experienced on the first optical channel due to transmissions on the second optical channel.

4. The method of claim 1, further comprising:
   removing, at an optical receiver that receives the pre-distorted optical signal on the second optical channel from the optical transmission medium, pre-distortion noise comprised in the received pre-distorted optical signal generated by applying the perturbation to the optical signal intended for transmission.

5. The method of claim 1, wherein the one or more linear filters comprise one or more finite impulse response filters.

6. The method of claim 1, wherein the first optical channel and the second optical channel are wavelength division multiplexing (WDM) channels.

7. The method of claim 1, further comprising:
   generating a predetermined spectrum of the optical power within the optical transmission medium using the pre-distorted optical signal.

8. The method of claim 1, wherein the estimate of the inter-channel nonlinear interference is based on receiver-based measurements of the inter-channel nonlinear interference.

9. A system for reducing nonlinear interference in an optical communication system, comprising:
   a first optical transmitter configured to transmit a first optical signal on a first optical channel;
   a second optical transmitter comprising one or more linear filters, wherein the second optical transmitter is configured
      to determine filter tap coefficient values for the one or more linear filters based at least in part on an estimate of inter-channel nonlinear interference experienced on the first optical channel due to transmissions on a second optical channel, where the second optical channel is distinct from the first optical channel,
      to use the one or more linear filters to calculate a perturbation solely from the filter tap coefficient values and from products of samples of an optical signal intended for transmission over the second optical channel,
      to apply the perturbation to the optical signal intended for transmission over the second optical channel to produce a pre-distorted signal, wherein the pre-distorted signal is configured for reducing the inter-channel nonlinear interference experienced on the first optical channel, and
      to transmit the pre-distorted optical signal over the second optical channel; and
   an optical multiplexer configured to transmit the first optical signal and the pre-distorted optical signal over an optical transmission medium.

10. The system of claim 9, further comprising an optical receiver configured to receive the first optical signal on the first optical channel over the optical transmission medium, wherein the estimate of inter-channel nonlinear interference is based on measurements at the optical receiver of the inter-channel nonlinear interference.

11. The system of claim 9, further comprising
   an optical receiver configured to receive the pre-distorted optical signal on the second optical channel over the optical transmission medium, wherein the optical receiver is configured to remove pre-distortion noise comprised in the received pre-distorted optical signal generated by applying the perturbation to the optical signal intended for transmission.

12. The system of claim 9, wherein the estimate of the inter-channel nonlinear interference comprises an estimate of cross-phase modulation (XPM) experienced on the first optical channel due to transmissions on the second optical channel.

13. The system of claim 9, wherein the estimate of the inter-channel nonlinear interference comprises an estimate of cross-polarization modulation (XPolM) experienced on the first optical channel due to transmissions on the second optical channel.

14. The system of claim 9, wherein the one or more linear filters comprise one or more finite impulse response filters.

15. The system of claim 9,
wherein the optical transmission medium comprises an optical fiber, and
wherein the one or more linear filters are configured based on one or more physical properties of the optical fiber.

16. The method of claim 1, wherein the estimate of the inter-channel nonlinear interference is calculated based on samples of optical symbols transmitted over the first optical channel and samples of optical symbols transmitted over the second optical channel.

17. The method of claim 5, wherein the one or more finite impulse response filters are configured based on one or more physical properties of the optical transmission medium.

18. The system of claim 14, wherein the one or more finite impulse response filters are configured based on one or more physical properties of the optical transmission medium.

19. The system of claim 9, wherein the estimate of the inter-channel nonlinear interference is calculated based on samples of optical symbols transmitted over the first optical channel and samples of optical symbols transmitted over the second optical channel.

* * * * *

UNITED STATES PATENT AND TRADEMARK OFFICE
CERTIFICATE OF CORRECTION

PATENT NO. : 10,270,537 B2
APPLICATION NO. : 15/707476
DATED : April 23, 2019
INVENTOR(S) : Zhuge et al.

Page 1 of 1

It is certified that error appears in the above-identified patent and that said Letters Patent is hereby corrected as shown below:

In the Specification

At Column 6, Line 32, equation (5) should read:

$$\Delta x1_k^{XPM} = x1_k \sum_{m=-M}^{M} C_{m,0}^{XNLI} [2|x2_{k+m}|^2 + |y2_{k+m}|^2 - 3P2] \quad (5)$$

$$\Delta y1_k^{XPM} = y1_k \sum_{m=-M}^{M} C_{m,0}^{XNLI} [2|y2_{k+m}|^2 + |x2_{k+m}|^2 - 3P2]$$

Signed and Sealed this
Twenty-eighth Day of May, 2019

Andrei Iancu
*Director of the United States Patent and Trademark Office*